(12) United States Patent
Oku

(10) Patent No.: US 6,192,286 B1
(45) Date of Patent: Feb. 20, 2001

(54) FA INFORMATION MANAGING METHOD

(75) Inventor: Masaharu Oku, Tokyo (JP)

(73) Assignee: Bridgestone Corporation, Tokyo (JP)

( * ) Notice: Under 35 U.S.C. 154(b), the term of this patent shall be extended for 0 days.

(21) Appl. No.: 09/057,584

(22) Filed: Apr. 9, 1998

(30) Foreign Application Priority Data

Apr. 24, 1997 (JP) .................................................. 9-107924
Jul. 1, 1997 (JP) .................................................. 9-176104

(51) Int. Cl.$^7$ .................................................. G06F 19/00
(52) U.S. Cl. .............................. 700/95; 700/91; 700/109; 701/101; 702/81
(58) Field of Search ............................... 700/91, 95, 103, 700/104, 108, 109, 3, 112, 115, 116, 9, 5, 12; 702/81, 84; 707/9, 104

(56) References Cited

U.S. PATENT DOCUMENTS

| | | | |
|---|---|---|---|
| 4,459,655 | * | 7/1984 | Willemin .................................... 700/3 |
| 4,803,613 | * | 2/1989 | Kametani et al. ......................... 700/3 |
| 4,831,582 | * | 5/1989 | Miller et al. .............................. 700/9 |
| 5,150,288 | * | 9/1992 | Imai et al. ............................. 700/116 |
| 5,375,070 | | 12/1994 | Hershey et al. ....................... 709/224 |
| 5,485,579 | * | 1/1996 | Hitz et al. ............................. 709/221 |
| 5,506,782 | * | 4/1996 | Omae et al. ........................... 700/211 |
| 5,604,914 | * | 2/1997 | Kabe ...................................... 710/1 |

OTHER PUBLICATIONS

IBM Technical Disclosure Bulletin, vol. 35, No. 2, Jul. 1992, Armonk, NY, US, pp. 357–361, XP000313325.
Proceedings—ISADS 97—Third International Symposium on Autonomous Decentralized Systems, Apr. 9–11, 1997, Berlin, DE, pp. 147–154, XP002070675.

* cited by examiner

Primary Examiner—William Grant
Assistant Examiner—Kidest Bahta
(74) Attorney, Agent, or Firm—Sughrue, Mion, Zinn, Macpeak & Seas, PLLC

(57) ABSTRACT

In order to cope with various types of requests for producing data which is predicted in the future, data which has been processed beforehand is not prepared, and raw information and the like which directly flows on a network is observed. When it is necessary to process the raw information and the like, a storage device and the like which is suitable for the amount of data and the processing is prepared. Then, direct access is made to the raw information and the like on the network, and the data is collected and processed independently from the existing device. As a result, it is no longer necessary to have knowledge on a structure of a file or a database in the existing storage device, a method of accessing, a processing history, and the like. Also, the request for processing various types of data, which is needed at the time of amelioration and improvement in the manufacturing processes, can be coped with flexibly and rapidly.

19 Claims, 2 Drawing Sheets

FA INFORMATION MANAGING METHOD

BACKGROUND OF THE INVENTION

1. Field of the Invention

The present invention relates to an FA (Factory Automation) information managing method in which a plurality of processes for manufacturing a product is summed, in which raw data in the respective processes is collected, in which predetermined information processing which is predictable in advance, such as statistics, comparison, evaluation, and the like, is carried out, and in which the respective processes are managed on the basis of the information processing.

2. Description of the Related Art

A distributed FA information management system in the manufacturing industry is based on a client/server model. In such FA information management system, in order to access to the information owned by the system, it is necessary to access to a server (storage device) which stores the information.

The information stored in the server is subjected to predetermined information processing which is predictable in advance, such as statistics, comparison, evaluation, and the like (e.g., actual production, actual operation, and the like). An operator can fetch necessary data from the data which has been subjected to predetermined information processing.

Such FA information management system is suitable for routine information processing (permanent routine information, such as an immediate report, a daily report, a monthly report, and the like) or data processing which is frequently reused.

However, the system is not suitable for data processing which is irregular and unpredictable in advance (e.g., collecting operation information or quality/QA information for recognizing the current state which is necessary for frequent amelioration and improvement in the manufacturing industry; or collecting evaluated data after manufacturing method or facility is improved). Further, from the aspect of cost, it is often difficult to mount data processing function which is used only for a short period and is less frequently reused (e.g., in a case in which an operator wants to know data only during the trial operation; or in a case in which he/she wants to investigate data immediately after the manufacturing process has been changed).

Namely, data which is necessary for improving the above-described production control is different in accordance with a process to be improved and ameliorated. In a case in which end data (e.g., dimension value and the like which is measured when raw materials are conveyed) which does not remain in the server as data is needed, a specific operator must be placed at the predetermined process for collecting the data. Moreover, it is unpredictable when and where trouble occurs. It is nearly impossible in reality to store the data as raw information (unprocessed information).

In this way, due to the variety of requests of data, the difficulty of prediction, the complication of structure of a database or a file, and the opacity of processing history, data which is less frequently reused cannot be managed by the server.

SUMMARY OF THE INVENTION

With the aforementioned in view, an object of the present invention is to obtain an FA information managing method in which drawbacks of a conventional client/server model are solved, in which information in accordance with the request of an operator can be easily fetched by him/her in a plurality of processes for manufacturing a product, and in which predetermined information processing, such as statistics, comparison, evaluation, and the like, which is necessary for production control, such as improvement, amelioration, and the like, can be carried out rapidly.

A first invention is an FA information managing method, comprising the steps of: transmitting raw information in a plurality of processes for manufacturing a product or a message group into which the raw information is appropriately classified to a data transmission network on a network, and designating and fetching the raw information or the message group; and on the basis of the fetched raw information or message group, executing new information processing which is unpredictable in advance.

In accordance with the first invention, the raw information, (cf. the processed information is subjected to data processing and is thereby obtained) which is not processed and has minute manufacturing processes, or the message group, into which the raw information is appropriately classified, flows into the data transmission network on the network. As the raw information or the message group is designated and fetched, the new processing information which is unpredictable in advance can be executed.

The raw information or the message group transmitted to the data transmission network can be fetched by using a technology in which the processed information (the message group) flows into the data transmission network and necessary information is fetched at random from the message group.

In the first invention, new information processing which is unpredictable in advance is executed on the basis of the fetched raw information and message group. Namely, fetching of the raw information or the message group for obtaining statistics, comparison, evaluation, and the like, which is currently needed and programming of executing a processing based on the raw information and the like can be performed without having adverse effect on the other device connected to the network.

Thus, in the system based on the conventional client/server model, it is extremely difficult to cope with rapidly and easily various types of requests in the future. On the contrary, the first invention is based on a mechanism in which, at the time of propagation of antibody cells, random gene recombination is effected so as to cope with various types of extraneous antigens and is not based on a mechanism in which, like a biological immune model, antibody manufacturing information based on the past experience is succeeded and prepared genetically in advance against various types of extraneous antigens.

Namely, in the first invention, in order to cope with various types of requests for processing data which is predicted in the future, data which has been processed beforehand is not prepared, and a broadcast-typed (or a node address independent type having an address server) message group which directly flows on the network is observed. When it is necessary to process the message group or the raw information included in the message group, a storage device or a storing method which is suitable for the amount of data or processing is prepared. The raw information or the message group on the network is directly accessed and data is collected and processed independently from the existing storage device.

Since the first invention has such mechanism, it is unnecessary to have knowledge on the structure of a file or a database in the existing storage device, the method of accessing, the processing history, and the like. Also, various types of requests for processing data which is needed at the time of amelioration and improvement in the manufacturing process can be coped with flexibly and rapidly.

As described above, in the first invention, the information in accordance with the operator's request can be easily fetched in the plurality of processes for manufacturing a product, and predetermined information processing, such as statistics, comparison, evaluation, and the like, which is necessary for production control of improvement, amelioration, and the like, can be carried out rapidly.

A second invention is an FA information managing method in which a plurality of processes for manufacturing a product is summed, in which raw data in the respective processes is collected, in which predetermined information processing which is predictable in advance, such as statistics, comparison, evaluation, and the like, is carried out, and in which the respective processes are managed on the basis of the information processing, comprising the steps of: fetching the raw information transmitted to a data transmission network on a network while designating collection timing and period as occasion demands; and on the basis of the fetched raw information, executing independently new information processing which is unpredictable in advance and which is different from the information processing.

The second invention is the system based on the conventional client/server model and follows the first invention as it is. In the second invention, access can be made freely to the data transmission network on the network. Moreover, no adverse effect is done to the above-described conventional system.

Namely, the second invention can coexist with the system based on the conventional client/server model and access can be made freely to the data transmission network on the network without having adverse effect on the conventional system.

Here, the raw information may be classified into a plurality of message groups which is predictable and which includes process/control information, quality, QA information, operation information, and trouble information.

It is favorable in this way at the time of search and the like to classify the raw information into a plurality of message groups which is predictable and which includes process/control information, quality, QA information, operation information, and trouble information.

A third invention is an FA information managing method in which a plurality of processes for manufacturing a product is summed, in which raw data in the respective processes is collected, in which predetermined information processing which is predictable in advance, such as statistics, comparison, evaluation, and the like, is carried out, and in which the respective processes are managed on the basis of the information processing, comprising the steps of: classifying the raw information into a plurality of message groups in advance by predictable combination; transmitting the classified message groups to a data transmission network on a network; at least designating the combination of every message group transmitted to the data transmission network on the network or every raw information included in the message group, and, as occasion demands, the collection timing and period; and thereby, on the basis of the message group and the raw information included in the message group, generating independently new information which is unpredictable in advance.

In accordance with the third invention, predetermined information processing which is predictable in advance, such as statistics, comparison, evaluation, and the like is carried out and respective processes based on the information processing is controlled by the system based on the conventional client/server model. Additionally, in this system, the raw information or the message group can be directly accessed to the network/data transmission network without having adverse effect on the system. As a result, the combination of every message group or every raw information included in the message group can be designated. The collection timing and period can be designated as occasion demands.

Next, on the basis of the designated and fetched raw information (or message group), predetermined processing is performed so as to obtain new information. In this case, the data collection period (short term, medium term, long term) can be selected freely and the data for ameliorating and improving the rapid manufacturing process can be obtained.

As described above, in the third invention, information in accordance with the operator's request can be easily fetched in the plurality of processes for manufacturing a product, and predetermined information processing, such as statistics, comparison, evaluation, and the like, which is necessary for the production control, such as improvement, amelioration, and the like, can be performed rapidly. Further, the third invention is based on the conventional client/server model and can coexist with the model without having adverse effect thereon. Moreover, since the raw information is classified into several message groups, it is easy to search.

DESCRIPTION OF THE PREFERRED EMBODIMENTS

Figure 1:
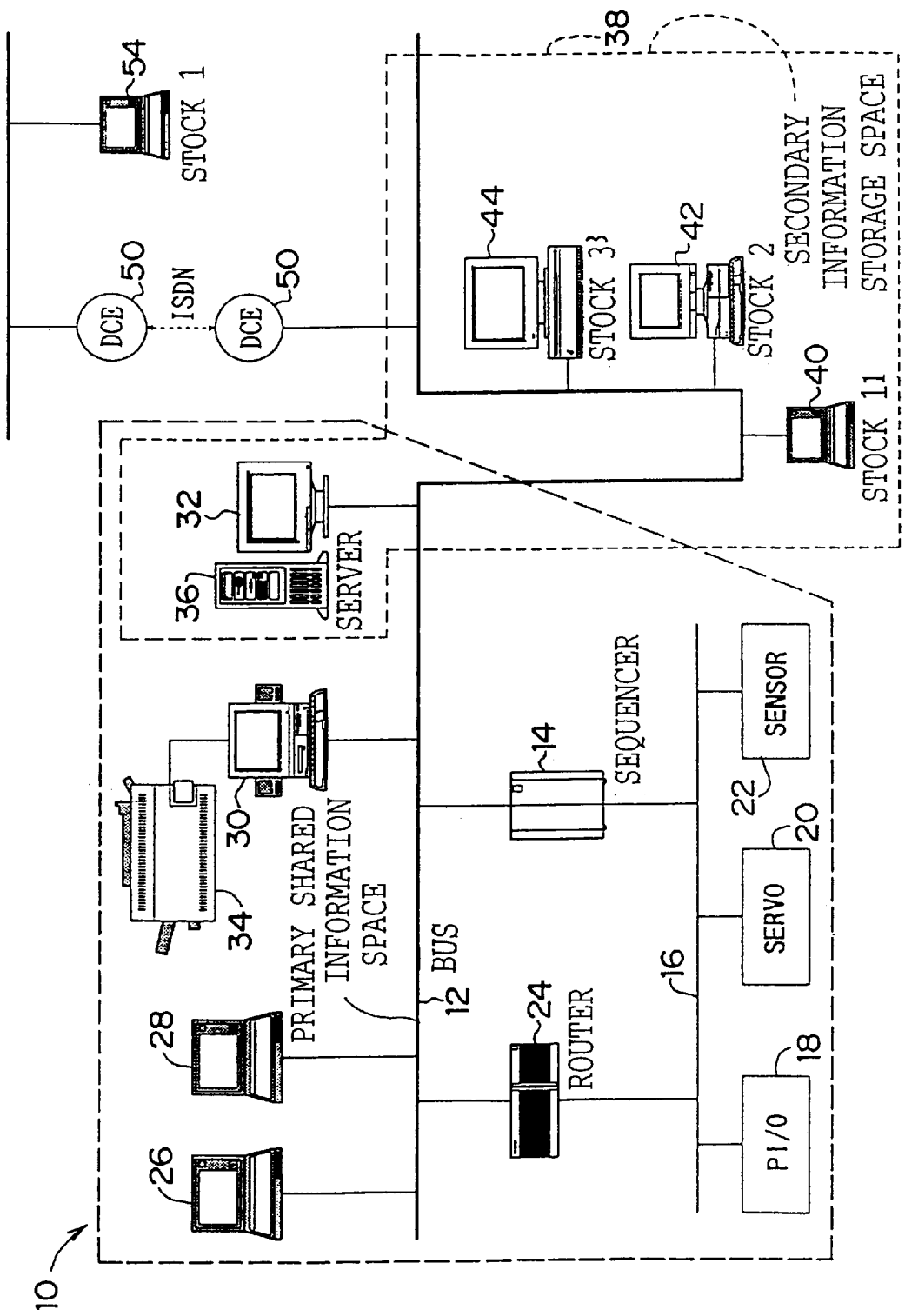
FIG. 1 is a block diagram of a system relating to a present embodiment.

FIG. 1 shows a block diagram of a flow-oriented system 10 for realizing an FA information management system relating to a present embodiment.

In the present embodiment, the system is explained as a bus-typed network. However, the network is not limited to the bus-typed network and may be a loop-typed, a star-typed, a mesh-typed, a route-typed, and the like. The system 10 surrounded by a dotted line in FIG. 1 is a client/server model system which has been already provided.

As shown in FIG. 1, a sequencer 14 is connected to a bus 12. The sequencer 14 controls the reciprocation of a signal between the bus 12 and a line 16 in the manufacturing process. The sequencer 14 stores a sequence program of each manufacturing process (or every fragmented processes which are classified within the same manufacturing process). Each process is controlled by the sequence program.

In each process, a PI/O 18, a SERVO 20, and a SENSOR 22 are connected to the line 16. Each of the devices receives designation from the sequencer 14 and operates accordingly.

Moreover, a router 24, which serves as a relay device for promoting the transmission of information, is interposed between the bus 12 and the line 16 in the manufacturing process. The router 24 transmits to the bus 12 the operating conditions of each device in the manufacturing process, the measured values of a product, and the like.

A plurality of terminal equipments (DTE) 26, 28, 30 is connected to the bus 12. The plurality of terminal equipments 26, 28, 30 serves for monitoring (production, operation information, quality, QA information, process/control information, trouble information) in every process by accessing to a server computer 32, which will be described later. The monitoring in each process can be performed by managing predetermined quality data.

Typical examples of the predetermined quality data are described as follows:

(1) count and compare specific sizes;
(2) count and compare specific sizes for every merchandise group;
(3) count and compare specific sizes for every device;
(4) count and compare specific sizes for every shift; and
(5) count and compare specific sizes for every operator.

The (1) through (5) are actual productions and actual operations, such that the data is counted on a regular basis and stored in a database (or server) for a long period.

On the basis of the quality data as described above, a trend graph, a bar chart, a round chart, a comparison table, a raw information list, and the like are output (printed) from a printer 34 connected to the terminal equipment 30.

Further, the server computer 32 fetches, processes and stores information for arranging the above quality data. The respective processing information is stored in a server 36 en bloc. The server computer 32 is accessible to the respective terminal equipments 26, 28, 30 which are connected to the bus 12.

The system described hereinbefore is based on the client/server model which has been already provided. As mentioned above, the above predetermined quality data (the processed data) is stored in the server 36 as shared data of the plurality of terminal equipments 26, 28, 30.

Such shared data is suitable for a long-term storage. However, because the shared data has been already processed, raw information (unprocessed information) which is required for amelioration and improvement cannot be obtained from the shared data.

Accordingly, in the present embodiment, a primary shared information space is defined as a dynamic information space formed by a message group (the detail will be described later) which flows into a network/data transmission network, and a secondary information storage space is defined as a static information space stored within the storage device group. The secondary information storage space also includes a storage device group which permits duplicate storage called a stock and a storage device which has been already provided.

Namely, the system is constructed based on a so-called two-hierarchical information space designing method (flow-oriented system) in which a primary shared information space which is shared by the entire system is designed at first, and then, a stock is designed as occasion demands.

In order to realize the system, it is necessary to flow raw information from each manufacturing process to the bus 12 at, for example, every predetermined times. The bus 12 space, through which the message group flows, forms the primary shared information space.

As shown in FIG. 1, three new terminal equipments 40, 42, 44 are provided as a part of the secondary information storage space. The terminal equipments 40, 42, 44 are respectively classified into a stock 1, a stock 2, a stock 3.

The terminal equipment 40 of the stock 1 is suitable for short-term (instant) storage. The terminal equipment 42 of the stock 2 is suitable for medium-term storage. The terminal equipment 44 of the stock 3 is suitable for long-term storage. Data which is suitable for short-term/medium-term storage is described below:

(6) at the time of improvement of a process, compare data before and after the improvement;
(7) at the time of improvement of machinery, evaluate data before and after the improvement;
(8) at the time of changing of operating method, compare data before and after the change;
(9) grasp the ratio of abnormal value of quality during a certain period by means of % or number;
(10) at the time of raising of machinery, grasp the condition of quality;
(11) compare the difference between lots; and
(12) grasp time series changes within the lot.

The (6) through (12) are data at the time of improvement, amelioration, change, and raise. The data is collected on an irregular basis, stored for a short/medium term, and retained in the stock 1 or 2. The short term and the medium term are not strictly different and selected in accordance with the demands of production quality control.

The aforementioned quality data (1) through (5) is suitable for the long-term storage.

The other short-term storage mainly includes a case in which, at the time of occurrence of trouble, the cause of trouble is investigated and detected early and emergent amelioration and improvement is required. The mid-term storage includes a case in which limited data resulted from trouble is needed, for example, during an unstable period from the provisional trouble shooting to the permanent trouble shooting, i.e., during a period which is unpredictable in advance. In order to meet the demands which change momentarily in the manufacturing industry, the long-term storage includes a case in which processed data which was unpredictable at the beginning is added if necessary, separately from the programming of the server computer 32, and without having any adverse effect thereon.

The operation of the present embodiment will be described hereinbelow.

In a case in which trouble occurs during operation, it is a matter of course that a production manager or the like runs to the site and investigates the cause of the trouble. In order to investigate the cause, conventionally, data is collected from the server 36 of the server computer 32 for determining as to from what time, in which process, and in what manner the changes were found. It is not particularly important when the determinations can be made by the data from the server 36. However, if the above-described determinations cannot be made, new data must be collected at the site. For example, if the width dimension of a product is needed, conventionally, a lot of man-hours are required for preparing a new software or modifying an existing software for access even if the numerical values are input to the server computer 32. As a result, instead of designing a software, a new sensor is provided or branched off from the signal line of an existing sensor, and measurement is directly effected at the site.

However, in the present embodiment, the entire raw information flows from the devices of each manufacturing process to the bus 12 (the primary shared information space) at, for example, every predetermined times. Accordingly, direct access is made to the bus 12 and necessary information can be fetched. As a result, the operation at the site is not required and the necessary information can be obtained even if the production manager is away from the site.

The terminal equipment 40 of the stock 1 is used for such data management which requires emergency. Namely, new processing information (in the above-described case, the rate of change in the degree of meandering of the conveyance system from the width dimension data or the like) in which the amount of data to be required is not large, which uses a commercially-available data management software program, and which is based on the raw information is generated. As a result, a quick measure can be taken (e.g., a guide plate is provisionally disposed and the degree of meandering is reduced).

The raw information is classified into message groups by message group classification means and the message groups are transmitted to the bus 12. The terminal equipment 40 includes a message search function and a message bind function.

Figure 2:
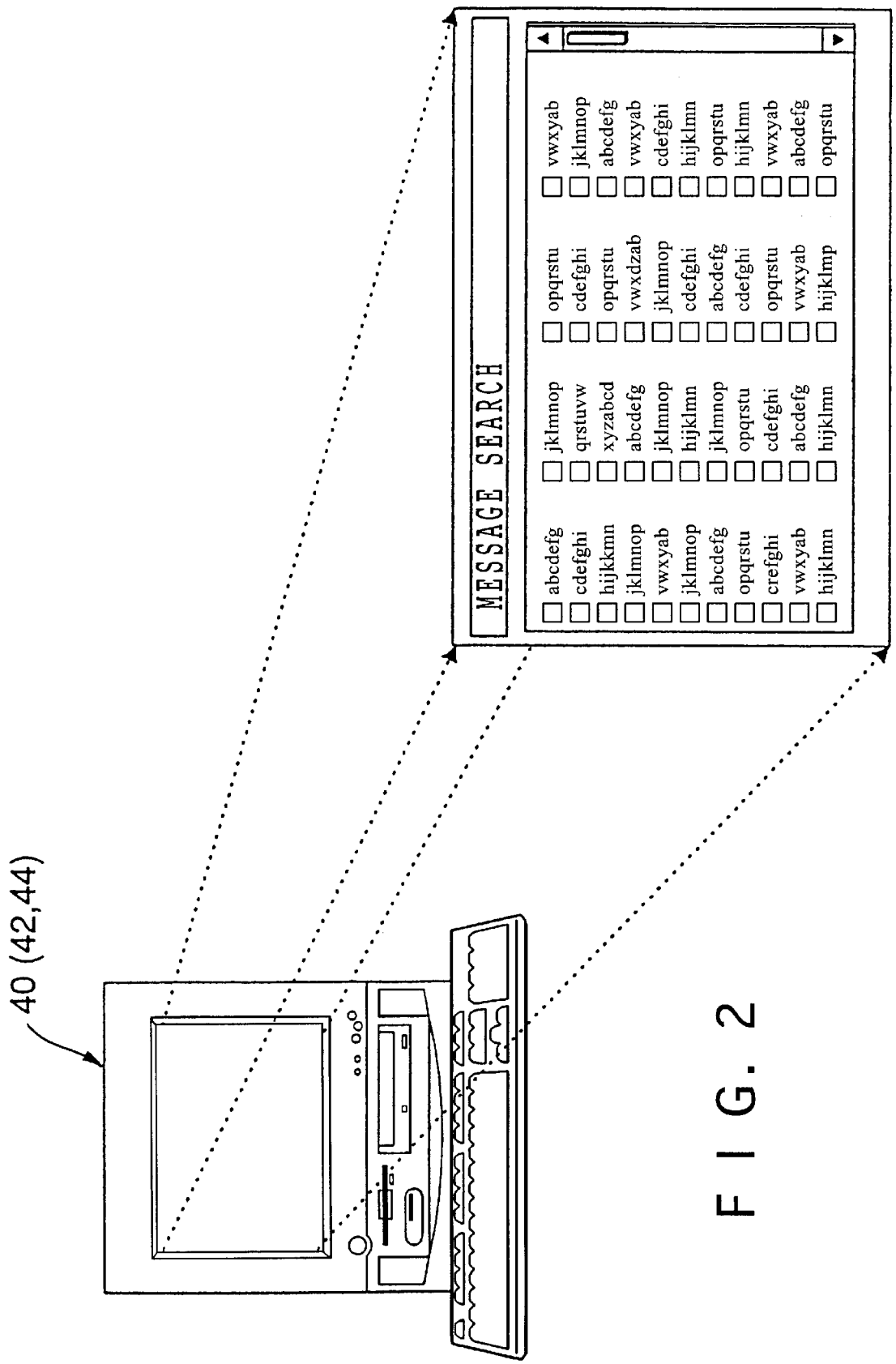
FIG. 2 is an elevational view which shows a raw information list displayed on a terminal equipment and a monitor of the terminal equipment.

FIG. 2 shows a list of raw information (definition information) classified into every message groups. Accordingly, even if the file name or the like attached to each raw information is not remembered, search and designation can be easily effected by searching and designating the necessary raw material/message group from the list by a pointer. The raw material/message group which is not listed can be added later. The message bind function designates from the following (1) through (4) definition information (My Agent) and performs processing (primary processing):

(1) designation of a desirable message group;
(2) designation of a message acquisition starting/ending condition (time, specific message, and the like);
(3) designation of a combining method in which a plurality of acquired message groups is combined and primary-processed as a new message; and
(4) designation of a primary processing method.

There are a database/EXCEL format file, a DOS file, and the like in the storage medium of the message. Further, in the data editing method at the time of storing a message, there is a case in which data within the message is processed by arithmetical operation and is then stored.

The above-described primary processed information is subjected to the various types of editing processes (the secondary processing) by general package software in the terminal equipment 40. The general package of the information which was subjected to the primary processing can be linked by the definition information.

Next, data during the unstable period from the provisional trouble shooting to the permanent trouble shooting is required. In this case, the mid-term storage is required and the terminal equipment 42 of the stock 2 is used.

In the terminal equipment 42 of the stock 2, the amount and the number of types of raw information to be required are larger than those of the terminal equipment 40 of the stock 1. Namely, even if the direct cause is meandering, it is necessary to investigate the indirect cause in which the meandering is due to the temperature control in the previous process.

As a result, the limited element (raw information) in which the current process and the previous process are linked is required. The necessity of information cannot be predicted at the beginning of programming of the server computer 32. Thus, the processing cannot be effected by the data stored in the server 36.

As the program of information processing which is suitable for each manufacturing process is incorporated in the terminal equipment 42 of the stock 2, a relatively large amount of data is gathered, a plurality of processes is linked, and new processing information can be generated.

In this way, for example, when the above-described measure against meandering is used as an example, because the temperature control threshold value in the previous process is reduced by X %, deformation due to the irregularity of temperatures is disappeared and meandering can be solved. Thus, the permanent measure can be taken rapidly and accurately.

The terminal equipment 44 of the stock 3 is used for determining whether each process operates favorably after the above permanent measure and for effecting long-term management. The after-measure determination and management cannot be predicted at the beginning of the operation, and enormous amount of time and manpower is needed for incorporating this into the program of the server computer 32. Thus, it is far from quick measure.

On the contrary, the terminal equipment 44 of the stock 3 has nothing to do with the server computer 32. On the basis of the raw information which is necessary for this permanent measure, a program which generates new processing information may be composed. Accordingly, quick measure can be taken.

Further, a small amount multiple product is a matter of course in the current manufacturing industry. Because the product itself changes rapidly, cycle of amelioration and improvement of the operation process becomes fast. The changing of programming of the server computer 32 for coping with the cycle cannot follow, and therefore, the delay becomes an obstacle to the production management. However, the flow-oriented system 10 of the present embodiment can sufficiently follow the cycle which changes at the early stage. Moreover, since the respective processing information remains independent, unnecessary processing information may be deleted.

As described above, the flow-oriented system 10 relating to the present embodiment can obtain rapidly and accurately the request data which changes momentarily. Further, since the flow-oriented system 10 operates rapidly, even at the time of emergency, such as at the time of occurrence of trouble, amelioration and improvement can be effected without delay, and the yield of a product can be improved.

Further, the necessary raw information can be obtained not at the site but from the remote place by accessing to the bus 12, necessary data can be obtained separately in the fields of design, production management, manufacturing technology, and the like. It is no longer necessary to rely on a few number of system engineers who manage the server computer 32.

Further, as shown in FIG. 1, as the bus 12 is connected to a telephone line via a DCE (data circuit terminating equipment) 50, management of the nationwide and worldwide factories can be concentrated at one place.

In the present embodiment, the terminal equipment 40 of the stock 1, terminal equipment 42 of the stock 2, and the terminal equipment 44 of the stock 3 are disposed in a row in the drawing. However, this is for convenience, and the terminal equipments 40, 42, 44 may be placed anywhere provided that the terminal equipments 40, 42, 44 are connected to the bus 12. Moreover, the functions of terminal equipments 40, 42, 44 can be integrated to one or a few, and the terminal equipments 40, 42, 44 may be removed. Furthermore, the conventional terminal equipments 26, 28, 30 may be used.

What is claimed is:

1. A factory automation managing method which manages each of a plurality of processes for manufacturing a product using a network connected to each of the plurality of processes, comprising:

making information generated in the processes flow to a data transmission network coupled to the network;

collecting information, which is necessary for executing new information processing, from the information which was made to flow, on the basis of one or more predetermined conditions by an information collecting terminal provided on the data transmission network; and executing the new information processing on the basis of the collected information.

2. A factory automation managing method according to claim 1, wherein the new information processing is processing which is unpredictable in advance.

3. A factory automation managing method according to claim 1, wherein the information made to flow to the data transmission network is any one of unprocessed information and a plurality of message groups which have classified the unprocessed information.

4. A factory automation managing method according to claim 3, wherein the message groups are formed by classifying the unprocessed information into a plurality of groups which include process/control information, quality information, QA information, operation information, and trouble information.

5. A factory automation managing method according to claim 1, wherein information which is necessary for a first term and a second term which is longer than the first term is collected from the information which was made to flow, at every term and new information processing which is different at every term is executed on the basis of the collected information.

6. A factory automation managing method according to claim 1, wherein the information generated in the processes is made to flow to the data transmission network at predetermined times.

7. A factory automation managing method in which a network connected to each of a plurality of processes for manufacturing a product is used, information generated in the processes is made to flow to a data transmission network coupled to the network and collected, the collected information is processed into managing information, and the processes are managed on the basis of the managing information, comprising:

collecting information, which is necessary for executing new information processing, from the information which was made to flow, on the basis of one or more predetermined conditions by an information collecting terminal provided on the data transmission network; and executing the new information processing, which is different from the processing in which the collected information is processed into the managing information, on the basis of the collected information.

8. A factory automation managing method according to claim 7, wherein the new information processing is processing which is unpredictable in advance.

9. A factory automation managing method according to claim 7, wherein the information which was made to flow to the data transmission network is any one of unprocessed information and a plurality of message groups which have classified the unprocessed information.

10. A factory automation managing method according to claim 9, wherein the message groups are formed by classifying the unprocessed information into a plurality of groups which include process/control information, quality information, QA information, operation information, and trouble information.

11. A factory automation managing method according to claim 7, wherein information which is necessary for a first term and a second term which is longer than the first term is collected from the information which was made to flow, at every term and new information processing which is different at every term is executed on the basis of the collected information.

12. A factory automation managing method according to claim 7, wherein the information generated in the processes is made to flow to the data transmission network at predetermined times.

13. A factory automation managing method which manages each of a plurality of processes for manufacturing a product using a network connected to each of the plurality of processes, comprising:

making a plurality of message groups which have classified unprocessed information flow to a data transmission network coupled to the network;

in order to execute new information processing, designating any one of a combination of the message groups and a combination of the unprocessed information included in the message groups, and further designating collection timing and term as occasion demands by an information collecting terminal provided on the data transmission network;

collecting the designated information; and executing the new information processing on the basis of the collected information.

14. A factory automation managing method according to claim 13, further comprising processing the collected information into managing information and managing each of the plurality of processes on the basis of the managing information, and the new information processing, which is different from the processing in which the collected information is processed into the managing information, is executed on the basis of the collected information in said executing the new information processing.

15. A factory automation managing method according to claim 13, wherein information which is necessary for a first term and a second term which is longer than the first term is collected from the information which was made to flow, at every term and new information processing which is different at every term is executed on the basis of the collected information.

16. A factory automation managing method according to claim 13, wherein the information generated in the processes is made to flow to the data transmission network at predetermined times.

17. A factory automation managing system which manages each of a plurality of processes for manufacturing a product using a network connected to each of the plurality of processes, comprising:

a primary shared information space which is a dynamic information space formed by information generated in the processes and made to flow to a data transmission network coupled to the network; and a secondary information storage space which is a static information space formed by collecting, by an information collecting terminal provided on the data transmission network and from the information which was made to flow, information which is necessary for executing new information processing on the basis of a predetermined condition, and storing the collected information.

18. A factory automation managing system according to claim 17, wherein said secondary information storage space includes a plurality of storage devices which permit the repetitive storage of the collected information.

19. A factory automation managing system according to claim 17, wherein said secondary information storage space includes a short-term storage space which stores the collected information for a short term and a long-term storage space which stores the collected information for a long term.

* * * * *